United States Patent

Peratis

[15] 3,640,374
[45] Feb. 8, 1972

[54] MAGNETIC CORE INSPECTION DEVICE

[72] Inventor: Michael P. Peratis, Newbury Park, Calif.
[73] Assignee: Ampex Corporation, Redwood City, Calif.
[22] Filed: Mar. 19, 1970
[21] Appl. No.: 21,096

[52] U.S. Cl. .................................198/30, 198/33 AA
[51] Int. Cl. ..........................B65g 47/24, B65g 47/26
[58] Field of Search.............198/30, 33 AA, 19; 209/123; 356/327

[56] References Cited

UNITED STATES PATENTS

| | | | |
|---|---|---|---|
| 2,788,882 | 4/1957 | Swartz | 198/30 |
| 2,321,331 | 6/1943 | Sweezey | 356/237 |
| 3,305,067 | 2/1967 | Mayer | 198/30 |

Primary Examiner—Edward A. Sroka
Attorney—Robert G. Clay

[57] ABSTRACT

A magnetic core inspection device is provided in which magnetic cores loaded into a cavity at one end of a plate are caused to migrate along the length of the plate under the influence of a coupled vibrator past an orienting section of the plate to an inspection track, the orienting section functioning to arrange the cores in a single row along the inspection track to facilitate inspection of the cores for imperfections using a microscope. The orienting section of the plate includes an elongated element extending between apertures and having a pair of mutually perpendicular, intersecting surfaces forming a track for the cores. The lateral dimensions of the surfaces are respectively less than the overall diameter and thickness of each core, causing excess cores to fall through the apertures and into a catch tray and thereby allowing a single row of cores to migrate onto the inspection track.

9 Claims, 12 Drawing Figures

INVENTOR.
MICHAEL P. PERATIS
BY Fraser and Bogucki
ATTORNEYS

INVENTOR.
MICHAEL P. PERATIS

MAGNETIC CORE INSPECTION DEVICE

BACKGROUND OF THE INVENTION

1. Field of the Invention

The present invention relates to visual inspection devices, and more particularly to devices and techniques for visually inspecting magnetic cores for manufacturing imperfections.

2. History of the Prior Art

With the widespread use of magnetic cores as memory elements in digital data processing and other related equipment, it has become commonplace to manufacture large batches of cores of increasingly smaller size. Cores may be manufactured in batches of tens of thousands and the core size or overall diameter may be as little as 13 mils, particularly where the cores are to be used for high speed memory applications. Cores of this magnitude are extremely tiny and resemble specks of dust or dirt particles to the human eye which is unaided by magnification equipment.

Magnetic cores may be manufactured by a number of different techniques, one of the most common techniques for fabricating cores of relatively small size employing a mold cavity and associated punch. A selected quantity of ferromagnetic powder is placed in the mold cavity and the punch of generally cylindrical configuration is introduced into the cavity with considerable force so as to compress the powder and thereby form a magnetic core. Thereafter, the formed core is typically subjected to further treatment such as sintering and quenching to impart the desired physical and magnetic characteristics thereto. During the pressing process, different types of imperfections can occur within the core, which imperfections may seriously affect the physical or magnetic properties of the formed core so as to render the core useless. One of the most common types of imperfections, which may result from worn tooling, overpressing or other factors, show up in the form of laminations on the inside diameter surfaces or outside diameter surfaces of the cores. Such laminations may comprise cracks or other surface imperfections and, when present, typically render the core unsuitable for most or all applications thereof. Other types of common imperfections include "feathers" in the form of ragged outcroppings or protrusions at the edges of the inside diameter and outside diameter surfaces and indentations or protrusions in the side surfaces of the core.

Because of the various imperfections which may occur during core manufacture, it is customary to visually inspect at least a random sampling of each manufactured batch. Such inspection is very difficult to perform, however, due in large part to the relatively small sizes of the cores. In one conventional technique for performing such an inspection, a clumping of cores from each manufactured batch is deposited on a screen suspended within a cylindrical container and individual ones of the cores are then inspected using a high magnification microscope. The microscope must be moved about and individually focused on randomly selected cores, a process which requires considerable time in view of the fact that most of the cores as deposited on the screen assume an orientation making proper visual inspection thereof impossible. Segregation of inspected cores from the others, moreover, is extremely difficult or impossible, making it likewise difficult or impossible to retain the inspected cores for future verification of their physical appearance.

BRIEF SUMMARY OF THE INVENTION

The present invention provides for the orderly and rapid orientation of all cores selected from a batch for visual inspection. Any number of cores from each batch can be selected for inspection and properly oriented for such inspection. The actual inspection process itself is made much more efficient and less time-consuming by the orientation of the cores at a fixed distance from the inspection microscope. The microscope may then be moved along the oriented cores, or vice versa, and need not be refocused each time a different core is inspected.

In inspection devices according to the invention, cores to be inspected are placed into a loading cavity at one end of an elongated plate which is mounted on top of a vibrator so as to be held in a substantially horizontal position. The vibrator, when turned on, imparts vibratory motion to the plate, both in an up-down direction and in a horizontal direction along the length of the plate, causing the cores to migrate along the length of the plate. Cores from the loading cavity advance to a core orienting section which includes an elongated portion of the plate disposed between two apertures and having a pair of mutually perpendicular, intersecting surfaces forming a track for the cores. The dimensions of the surfaces in a direction normal to the length of the elongated portion are respectively less than the overall diameter and thickness of each core. As a result a single row of cores, one thickness deep, proceeds along the track formed by the elongated portion, with excess cores falling through the apertures into a catch tray. Those cores falling into the catch tray are retrieved such as by use of a magnetic pen and may be placed back into the loading cavity or elsewhere as desired.

The single row of cores formed by the elongated portion within the core orienting section proceeds along a second track formed by a pair of mutually perpendicular, intersecting surfaces within a core inspection section of the plate, the two surfaces being substantially continuous with the two surfaces forming the track along the elongated portion in the core orienting section. The individual cores as disposed along the length of the track within the core inspection section may then be individually inspected using a high magnification microscope or other appropriate device. In one preferred arrangement of the invention, the microscope is rigidly mounted at a fixed distance relative to the plate, and the vibrator and included plate are made movable in a horizontal direction by mounting the vibrator on the carriage of a dovetail slide lead screw device. Adjustment of the lead screw device selectively positions different cores directly under and at a fixed distance from the microscope. Each core assumes a proper orientation for inspection, and all or some of the cores along the core inspection track may be inspected as desired. Also by virtue of being spread out along the track, individual cores are relatively easily removed if desired.

Upon completion of the inspection, the vibrator which is turned off to permit the inspection is again turned on causing the cores to migrate along the length of the plate. The previously inspected cores along the inspection track migrate to an unloading chute at the opposite end of the plate from the loading cavity where the cores slide into an appropriate container for retention as a record of inspection for future verification. As cores migrate along the inspection track toward the unloading chute other cores from the loading cavity more through the core-orienting section into the inspection section. Thus a single row of properly oriented cores is always available for inspection.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figures 1, 2, 3:
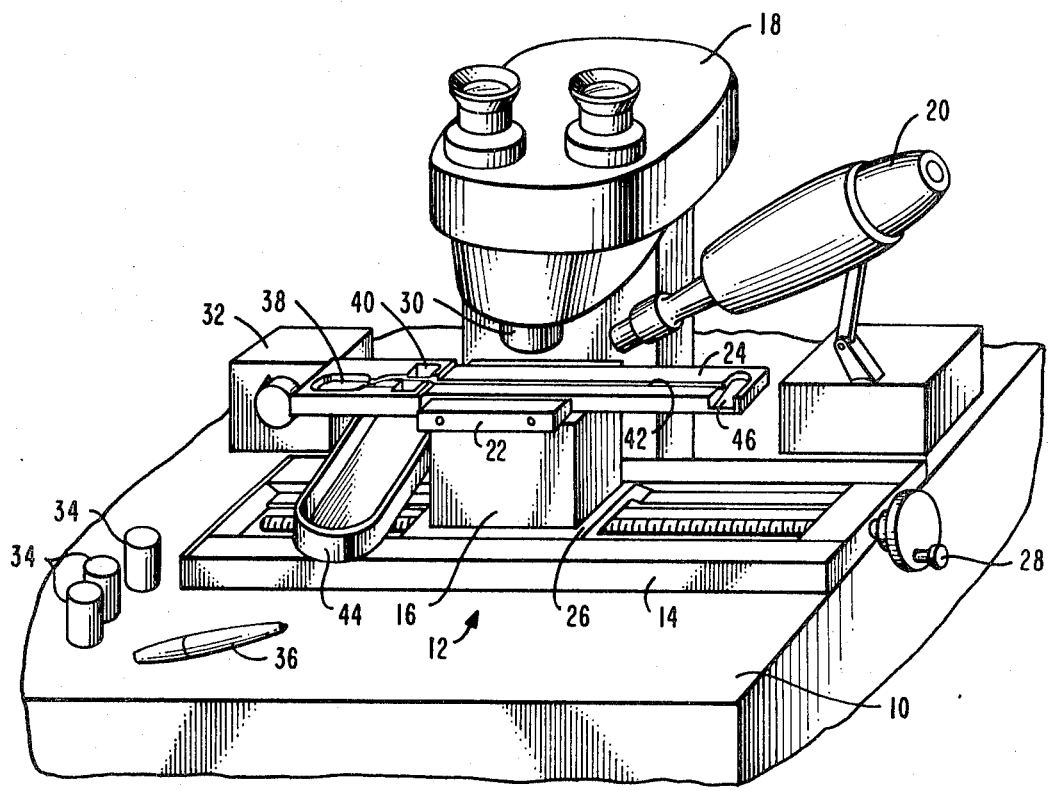
FIG. 1 is a perspective view of a magnetic core inspection device according to the invention.
FIG. 2 is a top view of one preferred form of a core inspection orientation plate which may be used in the device of FIG. 1.
FIG. 3 is a side view of the plate shown in FIG. 2.
Figure 4:
FIG. 4 is a left end view of the plate shown in FIG. 2.
Figure 5:
FIG. 5 is a right end view of the plate shown in FIG. 2.
Figure 6:
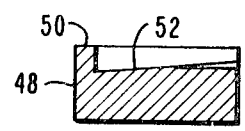
FIG. 6 is a sectional view of the plate shown in FIG. 2 taken along the line 6—6 thereof.

One preferred arrangement of a magnetic core inspection device in accordance with the invention is illustrated in FIG. 1 as it is mounted on a flat, substantially horizontal working surface 10 provided by the top of a table, workbench, or other appropriate arrangement. The inspection device, conveniently designated 12, includes a lead screw device 14 movably mounting a vibrator 16 relative to a high-power microscope 18 and a high intensity light source 20. Mounted on top of the vibrator 16 is a mounting bracket 22 having a generally U-shaped cross section for receiving and firmly holding in a substantially horizontal position an elongated core inspection orientation plate 24, the plate 24 being held within the bracket 22 by setscrews or other appropriate devices. The microscope 18 is bolted or otherwise firmly secured to the working surface 10 as is the lead screw device 14.

The vibrator 16 is mounted on top of a carriage 26 within the lead screw device 14, the carriage 26 being movable along the length of the device 14 under the control of a hand crank 28. The plate 24 is mounted with its axis of elongation generally parallel to the axis of movement of the carriage 26 so as to be movable generally in a direction parallel to its own axis of elongation. Accordingly, the axis of elongation of the plate 24 remains directly below and at a fixed distance from a lens 30 of the microscope 18 as the plate 24 undergoes lateral movement in response to the handcrank 28. The vibrator 16 is coupled to a power source (not shown) through a potentiometer 32 or other appropriate device for varying the amplitude of vibrations imparted to the plate 24 by the vibrator 16 until a desired amplitude level is achieved.

In operation, a plurality of magnetic cores as may be contained in one or more of a plurality of jars 34 are picked up using a magnetic pin 36 or other appropriate device and placed in a loading cavity 38 adjacent one end of the plate 24. The vibrator 16 is then turned on, and with the potentiometer 32 set to provide vibrations of suitable amplitude the cores in the loading cavity 38 migrate past a core-orienting section 40 of the plate 24 to a core inspection section 42 of the plate 24. In accordance with the invention, the core-orienting section 40 arranges the migrating cores into a single row of cores, one thickness deep, along the core inspection section 42 with excess cores from the loading cavity 38 falling into a catch tray 44 where they may be retrieved using the magnetic pen 36 and placed again in the loading cavity 38 or elsewhere as desired.

When the core inspection section 42 of the plate 24 is provided with a single row of cores along the length thereof, each core being properly oriented for visual inspection, the vibrator 16 is turned off stopping the migration of the cores along the plate 24. The operator then turns the handcrank 28 to position different ones of the cores along the core inspection section 42 under the lens 30 for visual inspection thereof. Some or all of the cores along the section 42 may be inspected as desired, the high intensity light source 20 providing ample illumination for this purpose. It will be noted that since cores to be inspected are maintained a fixed distance from the lens 30 it is not generally necessary to refocus the microscope 18 for each new core to be inspected as required by most prior art inspection techniques.

After the cores within the core inspection section 42 have been inspected, the vibrator 16 is again turned on causing the inspected cores to migrate to an unloading chute 46 at the opposite end of the plate 24 from the loading cavity 38 where the inspected cores slide down the chute 46 into one of the jars 34 or other appropriate container held in place at the foot of the chute 46 by the operator. At the same time, cores which previously remained in the loading cavity 38 migrate through the core-orienting section 40 where they are arranged into a single row of cores along the core inspection section 42 to take the place of the previously inspected cores.

The core inspection orientation plate 24 is shown in detail in FIGS. 2–10. As seen in FIG. 2 and particularly in FIG. 6, the loading cavity 38 at a first end 48 of the plate 24 is recessed downwardly from an upper surface 50 of the plate 24 and has a lower or bottom surface 52 which slopes gradually downwardly in a direction from the end of the loading cavity 38 adjacent the core orienting section 40 to the opposite end of the cavity adjacent the first end 48 of the plate 24. This reverse slope of the bottom of the loading cavity 38 tends to prevent the cores in the loading cavity 38 from migrating in large bunches toward the core-orienting section 40. The slope of the surface 52 is such as to form an appropriate angle relative to a horizontal plane, an angle of 4° having proved to be satisfactory in plates constructed and tested according to the invention.

In order to provide for proper migration of the magnetic cores along the length of the plate 24, the vibrator 16 (FIG. 1) is preferably of the type employing a so-called straight line motor for imparting motion which has a horizontal component as well as a vertical or up-down component. A commercially available vibrator which has been found to work successfully is sold under the designation Model MI-3SL by Affiliated Manufacturers, Inc. The internal components of this vibrator include an elongated slab horizontally positioned adjacent the top of the vibrator by a pair of leaf springs arranged to form angles with the slab other than 90°. A magnetic motor associated with one of the leaf springs causes back and forth movement of the springs, and the resulting motion of the slab is such as to impart to the plate 24 a vibratory motion having both a vertical component and a component in the direction of elongation of the plate from the first end 48 toward an opposite or second end 54. The Model MI-3SL vibrator operates at a base frequency of 3,600 cycles per second, although other frequencies such as 1,800 cycles per second can be achieved.

It has been found that the frequency of vibration has little if any effect on the manner in which the magnetic cores migrate along the length of the plate 24. Instead, the important consideration is the amplitude of vibration which is adjusted by the potentiometer 32 shown in the arrangement of FIG. 1. By simple experimentation, a proper amplitude for a given magnetic core size is easily found. Thereafter, the potentiometer 32 can be appropriately set to achieve that amplitude whenever cores of a given size are used. Where the inspection device is used with cores of different sizes, the potentiometer 32 is appropriately set for each particular core size used. Amplitudes which are too small result in the cores migrating much too slowly or not at all. Amplitudes which are too large, on the other hand, may result in the cores migrating through the core orienting section 40 so rapidly as to result in other than a single row of cores in the inspection section 42.

Cores migrating from the loading cavity 38 are directed onto a track 56 formed by the intersection of a flat surface 58 extending downwardly into the plate 24 from the upper surface 50 at an angle of approximately 30° relative thereto and a surface 60 which gradually curves from a point 62 where it is substantially normal to the axis of elongation of the plate 24 to a point where it becomes flat and generally parallel to the axis of elongation, the flat portion of the surface 60 forming an angle of approximately 60° relative to the upper surface 50 of the plate 24.

Figure 7:
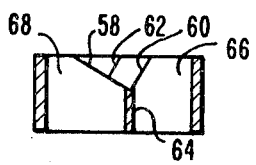
FIG. 7 is a sectional view of the plate shown in FIG. 2 taken along the line 7—7 thereof.
Figures 10, 12:
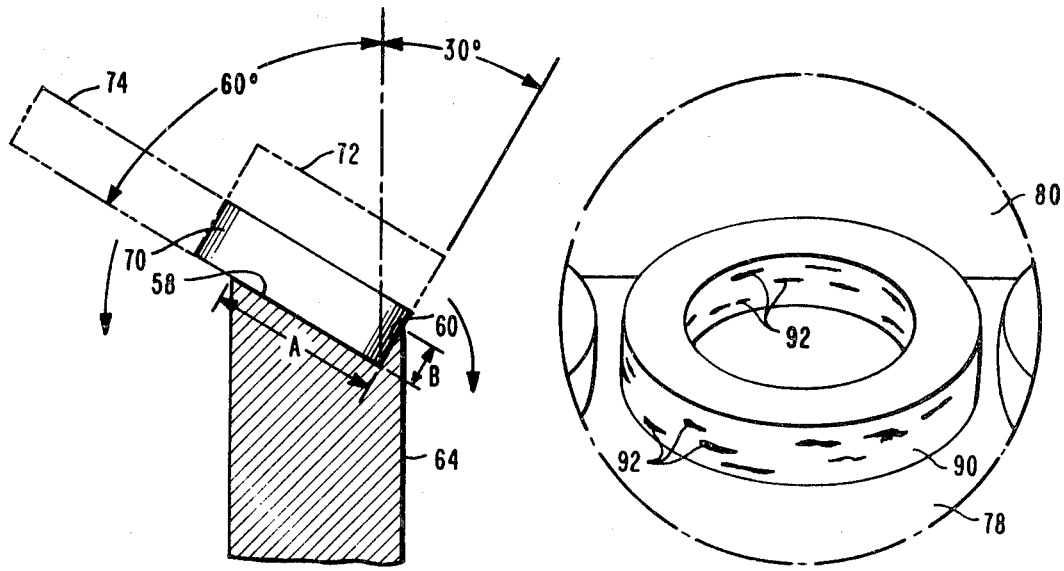
FIG. 10 is a greatly enlarged view of a portion of the sectional view of FIG. 7 illustrating the manner in which a grouping of cores is formed into a single row thereof in accordance with the invention.
FIG. 12 is a perspective view of several magnetic cores as seen through the microscope of the FIG. 1 device during inspection and illustrating examples of the type of imperfection which is looked for during inspection.

The track 56 narrows as it extends over an elongated portion or bridge 64 disposed between an opposite pair of apertures 66 and 68, the apertures 66 and 68 extending downwardly from the upper surface 50 of the plate 24 through the total thickness thereof as seen in FIG. 7. The bridge 64 is largely responsible for arranging the cores into a single row, one thickness deep, along the core inspection section 42 of the plate 24. As best seen in FIG. 10, which is a greatly enlarged showing of the upper portion of the bridge 64 in conjunction with a magnetic core 70, the mutually perpendicular, intersecting surfaces 58 and 60 along the bridge 64 have dimensions A and B in the lateral direction normal to the direction of elongation of the plate 24 which are respectively less than the overall or outside diameter and the thickness of the core 70. Cores which assume a proper orientation as in the case of the core 70 seen in FIG. 10 as they enter the elongated portion or bridge 64 overhang the bridge 64 on both sides but have enough surface area support so as to be able to move across the bridge 64 to the core inspection section 42 while assuming this orientation. Cores which may be stacked on top of other cores so as to assume a position as shown by the dashed outline 72 in FIG. 10 slide off of the cores thereunder and fall through the aperture 66 into the catch tray 44 (FIG. 1). Still other cores which may be disposed adjacent to or in contact with other cores so as to assume a position represented by a dashed outline 74 in FIG. 10 and thereby form a double row of cores as they approach the bridge 64, fall through the aperture 68 into the catch tray 44 (FIG. 1). Cores may assume other positions relative to the core 70 than those shown by the dashed outlines 72 and 74, and in any event fall into one or the other of the apertures 66 and 68.

As seen in FIG. 10, the surfaces 58 and 60 respectively form angles of approximately 60° and 30° relative to a vertical plane in the direction of elongation of the plate 24 so as to form a right-angle at their intersection at the bottom of the portion of the track 56 extending therealong.

Figure 8:
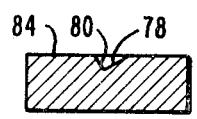
FIG. 8 is a sectional view of the plate shown in FIG. 2 taken along the line 8—8 thereof.

As seen in FIG. 2 and in FIG. 8 the core inspection section 42 includes an elongated core inspection track 76 formed by a pair of mutually perpendicular, intersecting surfaces 78 and 80. The surfaces 78 and 80 are generally continuous with the surfaces 58 and 60 respectively, and assume angles of approximately 60° and 30° respectively relative to a vertical plane extending along the direction of elongation of the plate 24. Accordingly, the inspection track 76 extends in a direction generally parallel to the direction of elongation of the plate 24 between the core orienting section 40 and the unloading chute 46. As seen in FIG. 3, the thickness of the plate 24 between the upper surface 50 and a lower surface 82 decreases at the juncture between the core orienting section 40 and the core inspection section 42 such that the surfaces 78 and 80 forming the inspection track 76 extend downwardly from an upper surface 84 along the right-hand portion of the plate 24.

Figure 9:
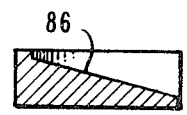
FIG. 9 is a sectional view of the plate shown in FIG. 2 taken along the line 9—9 thereof.

As seen in FIGS. 2, 3 and 9, the unloading chute 46 adjacent the second end 54 of the plate 24 is recessed so as to extend downwardly into the plate from the upper surface 84. The chute 46 has a lower or bottom surface 86 which is relatively flat and which slopes gradually downwardly in a direction toward the front of the plate 24 as best seen in FIG. 9. As the magnetic cores migrate along the inspection track 76 in response to vibratory motion, they fall into the unloading chute 46 where they slide downwardly along the surface 86 to a jar or other appropriate receptacle for the cores as previously described.

Figure 11:
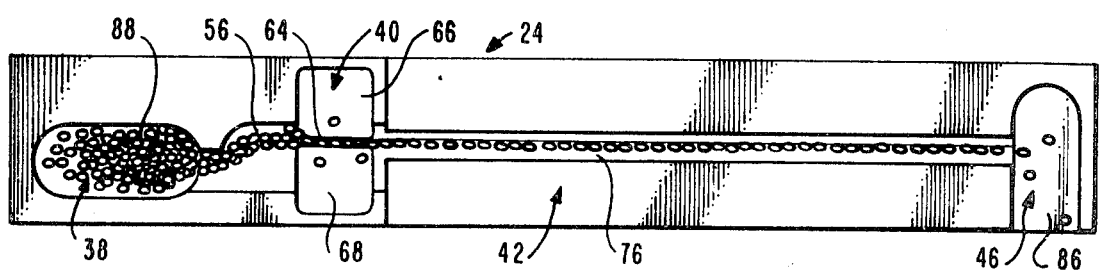
FIG. 11 is a top view of the plate shown in FIG. 2 illustrating the manner in which magnetic cores are caused to migrate along the length thereof in response to vibratory motion.

A typical migration pattern for the magnetic cores is shown in FIG. 11. As previously described, a clump 88 of cores is placed in the loading cavity 38, after which the vibrator is turned on. The cores in the clump 88 respond to the vibratory motion by migrating onto the track 56 in a relatively narrow column as provided by the sloped bottom surface of the loading cavity 38. At the bridge 64, the cores are formed into a single row with the excess cores falling through the apertures 66 and 68 as shown in FIG. 11. With the vibrator turned off the single row of cores along the inspection track 76 remains stationary, and some or all of the cores along the track 76 may be visually inspected as desired using the microscope 18 (FIG. 1). Rotation of the handcrank 28 of the lead screw device 14 (FIG. 1) moves the entire plate 24 in a direction paralleling the direction of elongation of the plate to place different ones of the cores along the inspection track 76 directly under the microscope lens 30 for examination. With the vibrator again turned on, the cores along the inspection track 76 migrate to the unloading chute 46 where they fall into the chute and slide downwardly along the bottom surface 86 as seen in FIG. 11.

FIG. 12 depicts a typical image of a core located along the track 76 as provided by the microscope 18 (FIG. 1). It will be appreciated from FIG. 12 that each of the cores along the inspection track 76 assumes a suitable orientation for the visual inspection thereof, particularly with respect to the inside and outside diameters of the core. Visual inspection of a particular core 90 shown in FIG. 12 reveals a number of laminations 92 on both the inside diameter and outside diameter surfaces thereof. Laminations of the type depicted in FIG. 12 might seriously affect both the physical and magnetic properties of the core 90 resulting in a decision to reject this particular core. Because of the manner in which the cores are strung out in a single row along the inspection track 76, the core 90 can be easily removed from the track 76 by the operator using an appropriate tool for this purpose if desired.

The core inspection orientation plate 24 may be made of any appropriate nonmagnetic material, aluminum being generally preferred for most applications. The plate is formed using conventional machining techniques with appropriate tolerances. Different plates 24 are used for different sized cores, the plates being the same except for the A and B dimensions of the surfaces along the bridge 64. Thus, where magnetic cores having an outside diameter of 18 mils and a thickness of 4.2 mils are being inspected, the plate is typically machined so as to have A and B dimensions of 16.5 mils ± 0.5 mils and 3.6 mils ± 0.5 mils respectively. Where cores having an overall diameter of 30 mils and a thickness of 7.5 mils are being inspected, the A and B dimensions are typically machined to 27.5 mils ± 0.5 mils and 6.7 mils ± 0.5 mils respectively. The plates themselves may be of any appropriate size, those plates manufactured and tested according to the invention having a length of approximately 8 inches, a width of approximately 1.13 inches and thicknesses of approximately 0.500 inch and 0.375 inch.

The microscope 18 (FIG. 1) may comprise any appropriate device which provides suitable magnification to enable visual inspection of the core sizes used. One microscope which has been found to provide ample magnification for core sizes as small as 18 mils is sold under the designation Stereozoom by Bausch and Lomb Co. This particular microscope has a magnification range of 7–30 with provisions for doubling this to provide as much as 60-power magnification when needed.

The lead screw device 14 (FIG. 1) may comprise any appropriate device capable of mounting and horizontally moving the plate 24. The particular device 14 depicted in FIG. 1 is sold under the designation Uni Slide, Model A4,000 by Velmex, Inc.

While the invention has been particularly shown and described with reference to a preferred embodiment thereof, it will be understood by those skilled in the art that various changes in form and details may be made therein without departing from the spirit and scope of the invention.

What is claimed is:

1. For use in an arrangement for inspecting magnetic cores, an element having a first portion for receiving magnetic cores to be inspected, a second portion for holding cores during inspection, and a third portion disposed between the first and second portions and including means for forming from a plurality of cores received by the first portion a single row of cores at the second portion in response to the application of vibratory motion to the element, the forming means comprising a pair of intersecting surfaces in the third portion which form angles with a horizontal plane and which are dimensioned so as to be smaller than mating portions of magnetic cores.

2. For use in an arrangement for inspecting magnetic cores, an element having a first portion for receiving magnetic cores to be inspected, a second portion for holding cores during inspection, and a third portion disposed between the first and second portions and including means for forming from a plurality of cores received by the first portion a single row of cores at the second portion in response to the application of vibratory motion to the element, said forming means comprising an elongated portion of the element extending between the first and second portions and elevated relative to adjacent areas of the member, the elongated portion having a pair of intersecting surfaces forming an elongated core track, and the dimensions of the pair of intersecting surfaces in a direction normal to the direction of elongation of the core track being respectively less than the thickness and the diameter of the individual cores to be inspected.

3. An element in accordance with claim 2, further including means defining apertures on the opposite sides of the elongated portion of the element, the apertures extending downwardly through the thickness of the element.

4. An element in accordance with claim 2, wherein the second portion for holding cores during inspection comprises a second elongated core track formed by a second pair of intersecting surfaces, the second pair of surfaces being generally continuous with different ones of the first-mentioned pair of intersecting surfaces forming the first-mentioned elongated core track.

5. A core inspection orientation plate for use in an arrangement in which magnetic cores are advanced along an orientation plate in response to vibratory motion so as to assume a desired orientation and arrangement for visual inspection thereof, the plate comprising an elongated element having a core loading cavity recessed downwardly from an upper surface of the element adjacent a first end of the element, a core unloading chute recessed downwardly from an upper surface of the element adjacent a second end of the element opposite the first end, a core orienting section adjacent the core loading cavity including a raised, elongated portion generally parallel to the direction of elongation of the element and having a pair of mutually perpendicular, intersecting surfaces forming a first portion of a track for the cores, the first portion of the track communicating with the core loading cavity and at least one of the pair of surfaces having a dimension in a direction normal to the direction of elongation of the element which is less than an overall dimension of individual ones of the cores, and a core inspection section comprising a second pair of mutually perpendicular, intersecting surfaces extending between the first portion of the track for the cores and the core unloading chute in a direction generally parallel to the direction of elongation of the element and forming a second portion of the track for the cores, the second pair of surfaces being substantially continuous with different ones of the first-mentioned pair of surfaces.

6. A plate in accordance with claim 5, wherein the core loading cavity has a bottom surface which slopes downwardly in a direction away from the core orienting section and toward the first end of the element, the first-mentioned pair of surfaces have dimensions in a direction normal to the direction of elongation of the element which are respectively slightly less than the thickness and the outside diameter of each of the cores to be inspected, and further including means defining a pair of apertures on the opposite sides of the raised, elongated portion.

7. An arrangement for inspecting magnetic cores comprising the combination of a core orienting member having a portion for loading magnetic cores to be inspected, a portion for presenting cores for visual inspection, and a portion disposed between the loading portion and the inspecting portion and dimensioned so as to allow only a single row of cores to pass from the loading portion to the inspection portion, the portion for allowing only a single row of cores to pass comprising a pair of intersecting surfaces which form angles with a horizontal plane and which are dimensioned so as to be smaller than mating portions of cores, and means disposed in contact with the member for imparting vibratory motion thereto.

8. An arrangement in accordance with claim 7, wherein the member is disposed substantially horizontally, and the means for imparting vibratory motion imparts at least a portion of the motion in a direction from the loading portion of the member to the inspection portion.

9. An arrangement in accordance with claim 8, wherein the means for imparting vibratory motion comprises a vibrator, the vibrator receiving and supporting the member, and further including means mounting the vibrator and included member for adjustably positioning the member relative to an inspection point to facilitate the visual inspection of cores at different locations within the inspection portion of the member.

* * * * *